US011423492B2

(12) United States Patent
Dail et al.

(10) Patent No.: US 11,423,492 B2
(45) Date of Patent: Aug. 23, 2022

(54) COMPUTING RISK FROM A CROP DAMAGING FACTOR FOR A CROP ON AN AGRONOMIC FIELD

(71) Applicant: CLIMATE LLC, San Francisco, CA (US)

(72) Inventors: Holly Janine Dail, Seattle, WA (US); Patricia Ann Carroll, Seattle, WA (US); Bethany Susan Porter Grabow, Moscow Mills, MO (US); Jerald Keith Pataky, Champaign, IL (US); Ana Malagon, San Francisco, CA (US)

(73) Assignee: CLIMATE LLC, San Francisco, CA (US)

( * ) Notice: Subject to any disclaimer, the term of this patent is extended or adjusted under 35 U.S.C. 154(b) by 132 days.

(21) Appl. No.: 15/820,317

(22) Filed: Nov. 21, 2017

(65) Prior Publication Data

US 2019/0156437 A1  May 23, 2019

(51) Int. Cl.
*G06Q 50/02* (2012.01)
*G06Q 10/06* (2012.01)
*G01W 1/06* (2006.01)

(52) U.S. Cl.
CPC ......... *G06Q 50/02* (2013.01); *G06Q 10/0635* (2013.01); *G01W 1/06* (2013.01)

(58) Field of Classification Search
CPC .......................... G06Q 10/0635; G06Q 50/02
See application file for complete search history.

(56) References Cited

U.S. PATENT DOCUMENTS 8,626,698 B1  1/2014  Nikolaev et al.
9,563,852 B1  2/2017  Wiles
(Continued)

FOREIGN PATENT DOCUMENTS

WO  WO 2015/100023 A1  7/2015

OTHER PUBLICATIONS

A Web-based Information System for Plant Disease Forecast Based on Weather Data at High Spatial Resolution; Kang et al; Nov. 18, 2009 (Year: 2009).*
Chilling and forcing model to predict bud burst of crop forest species; Cesaraccio at el; 2005 (Year: 2005).*
Growing degree hours—a simple, accurate, and precise protocol to approximate growing heat summation for grapevines; Gu; Aug. 2016 (Year: 2016).*
How to use the Peanut Leaf Spot Advisor; Sep. 2012 (Year: 2012).*
(Continued)

*Primary Examiner* — Deirdre D Hatcher
(74) *Attorney, Agent, or Firm* — Harness, Dickey & Pierce, P.L.C.

(57) ABSTRACT

Systems and methods for determining a risk of damage to a crop on an agronomic field are described. In an embodiment, a computer system receives, for each hour of a first day, weather data identifying temperature values and humidity values associated with a geographic location. The computer system determines, for a particular hour of the first day, that a temperature value is within a first range of values and a humidity value is within a second range of values and, in response, identifies the particular hour as a risk hour. The computer system computes, for a second day, a risk value for one or more agronomic fields at the geographic location based, at least in part, on one or more identified risk hours between a day of planting a crop on the one or more agronomic fields and the second day. The computer system determines that the risk value is above a risk value threshold and, in response, determines that the crop on the one or more agronomic fields is at risk of suffering damage from a particular crop damaging factor. The computer system stores data indicating that the crop is at risk of suffering damage from the particular crop damaging factor.

12 Claims, 7 Drawing Sheets

(56) References Cited

U.S. PATENT DOCUMENTS

| | | | |
|---|---|---|---|
| 2006/0282228 A1 | 12/2006 | Avey | |
| 2012/0123817 A1* | 5/2012 | Hohenberger | G06Q 10/0631 705/7.12 |
| 2014/0108060 A1 | 4/2014 | Anderson | |
| 2014/0189903 A1 | 7/2014 | Duncan et al. | |
| 2015/0248720 A1 | 9/2015 | Brown | |
| 2015/0278967 A1 | 10/2015 | Jump | |
| 2016/0073573 A1 | 3/2016 | Ethington | |
| 2016/0078569 A1 | 3/2016 | Ethington | |
| 2016/0078570 A1* | 3/2016 | Ethington | G06Q 10/1097 705/7.21 |
| 2016/0223506 A1 | 8/2016 | Shriver et al. | |
| 2016/0224703 A1 | 8/2016 | Shriver | |
| 2016/0232621 A1 | 8/2016 | Ethington | |
| 2017/0105335 A1 | 4/2017 | Xu et al. | |
| 2017/0124463 A1 | 5/2017 | Chen | |
| 2017/0213141 A1 | 7/2017 | Xu | |
| 2017/0228475 A1 | 8/2017 | Aldor-Noiman | |
| 2017/0295732 A1 | 10/2017 | Skinner | |
| 2017/0311559 A1 | 11/2017 | Ebert et al. | |
| 2017/0349957 A1* | 12/2017 | Champagne | A01N 63/04 |
| 2017/0351790 A1* | 12/2017 | Farah | G06Q 50/02 |
| 2018/0181893 A1 | 6/2018 | Basso | |
| 2019/0050510 A1* | 2/2019 | Mewes | G06F 30/20 |
| 2019/0138962 A1 | 5/2019 | Ehlmann | |

OTHER PUBLICATIONS

Cabbage Growth Stages; J. T. Andaloro et al; 1983 (Year: 1983).*
Moisture Matters; Cannibus Business Times; Jul. 2017 (Year: 2017).*
Fusarium head blight risk assessment models and DON prediction model; Diane Brown-Rytlewski; Michigan State University (Year: 2008).*
The International Searching Authority, "Search Report" in application No. PCT/US2018/059858, dated Jan. 22, 2019, 7 pages.
Current Claims in application No. PCT/US2018/059858, dated Jan. 2019, 5 pages.
The International Bureau of WIPO, "International Preliminary Report on Patentability", in application No. PCT/US2018/059858, dated May 26, 2020, 5 pages.
Current Claims in application No. PCT/US2018/059858, dated May 2020, pp. 5 pages.
Paul, P. A., et al., "Influence of Temperature and Relative Humidity on Sporulation of Cercospora zeae-maydis and Expansion of Gray Leaf Spot Lesions on Maize Leaves", Plant Disease, the Amer. Phyto. Soc., vol. 89, No. 6, pp. 624-630, Jun. 2005 ,7 pages.
European Patent Office, "Extended Search Report" in application No. 18882105.2, dated Jul. 2, 2021, 32 pages.
Drake, DW, "Reproductive Success of Two Eucalyptus Hybrid Populations", I Generalized Seed Output Model and Comparison of Fruit Parameters, Australian Journal of Botany 29(1) 25-35, 1981, 11pgs.
The International Searching Authority, "Search Report" in application No. PCT/US2018/059848, dated Jan. 17, 2019, 10 pages.
The Internationa Bureau of WIPO, "International Preliminary Report on Patentability", in application No. PCT/US2018/059848, dated May 12, 2020, 7 pages.
Nocco et al., "Enterprise Risk Management: Theory and Practice", in Journal of applied corporate finance, dated Dec. 7, 2006, 15 pages.
Miao et al., "Within-field Variation in Corn Yield and Grain Quality Responses to Nitrogen Fetrilization and Hybrid Selection", In Agronomy Journal, dated Jan. 2006, 13 pages.
Mexican Patent Office, "Office Action" in application No. MX/a/2020/004738, dated May 14, 2021, 10 pages.
Mexican Patent Office, "Office Action" in application No. MX/a/2020/004738, dated Mar. 8, 2021, 5 pages.
Mexican Claims in application No. MX/a/2020/004738, dated May 17, 2021, 6 pages.
Mexican Claims in application No. MX/a/2020/004738, dated May 14, 2021, 6 pages.
Engle, "Risk and Volatility: Econometric Models and Financial Practice", In: American Economic Review, dated Dec. 8, 2003, 24 pages.
Current Claims in application No. PCT/US2018/059848, dated May 2020, 5 pages.
Current Claims in application No. PCT/US2018/059848, dated Jan. 2019, 6 pages.
Current Claims in application No. 3,081,024, dated May 2021, 5 pages.
Canadian Patent Office, "Office Action" in application No. 3,081,024, dated May 4, 2021, 7 pages.
Canada Patent Office, "Office Action" in application No. 3,081,024, dated Dec. 11, 2020, 9 pages.
Canada Claims in application No. 3,081,024, dated Dec. 2020, 6 pages.
Ehlmann, U.S. Appl. No. 15/807,872, filed Nov. 9, 2017, Notice of Allowance and Fees Due, dated Oct. 5, 2021.
European Patent Office, "Communication pursuant to Rules 70(2) and 70a(2) EPC", in application No. 18877274.3, dated Jun. 22, 2021, 8 pages.
Claims, in application No. 3,082,814, dated Jun. 30, 2021, 5 pages.
Canadian Patent Office, "Office Action", in application No. 3,082,814, dated Jun. 30, 2021, 4 pages.
Ehlmann, U.S. Appl. No. 15/807,872, filed Nov. 9, 2017, Office Action, dated Apr. 12, 2021.
Ehlmann, U.S. Appl. No. 15/807,872, filed Nov. 9, 2017, Office Action, dated May 12, 2020.
Ehlmann, U.S. Appl. No. 15/807,872, filed Nov. 9, 2017, Interview Summary, dated Aug. 10, 2020.
Ehlmann, U.S. Appl. No. 15/807,872, filed Nov. 9, 2017, Final Office Action, dated Oct. 9, 2020.
Ehlmann, U.S. Appl. No. 15/807,872, filed Nov. 9, 2017, Advisory Action, dated Dec. 18, 2020.
Ehlmann, U.S. Appl. No. 15/807,872, filed Nov. 9, 017, Final Office Action, dated Oct. 9, 2020.
Ehlmann, U.S. Appl. No. 15/807,872, filed Nov. 9, 2017, Office Action, dated Aug. 29, 2019.
Ehlmann, U.S. Appl. No. 15/807,872, filed Nov. 9, 2017, Interview Summary, dated Jun. 30, 2021.
Ehlmann, U.S. Appl. No. 15/807,872, filed Nov. 9, 2017, Final Office Action, dated Jan. 24, 2020.

* cited by examiner

Fig. 2
(a)
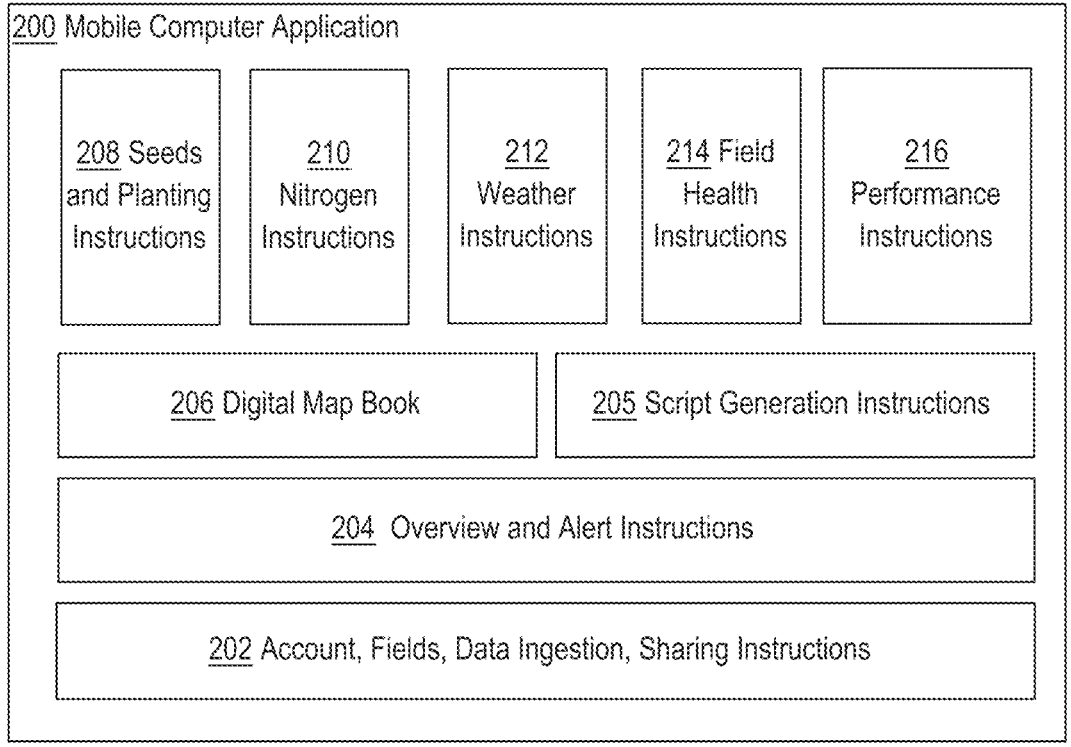
(b)
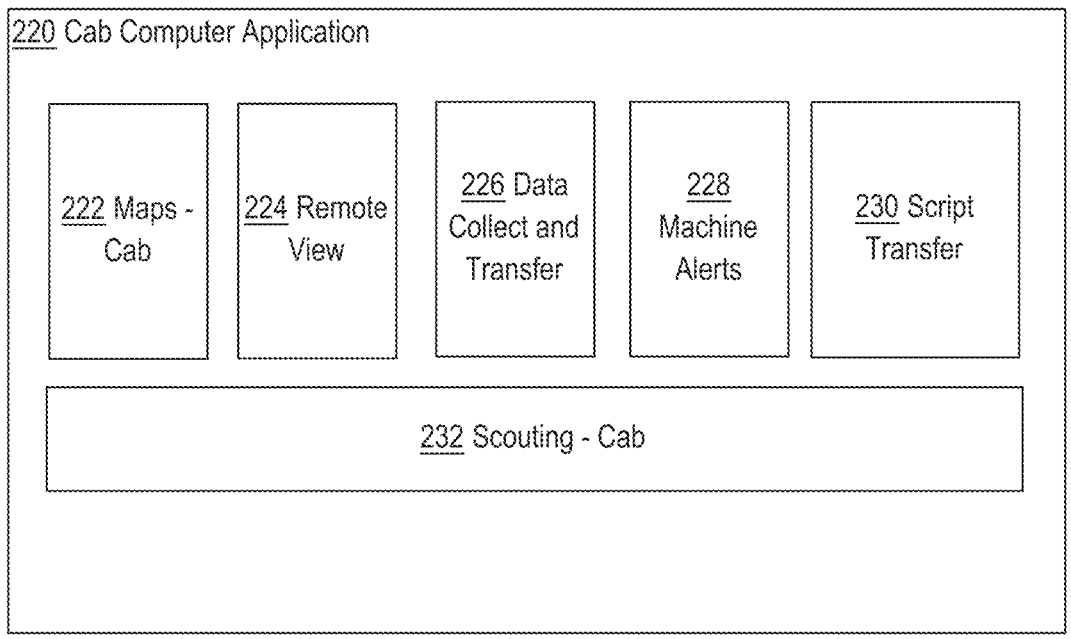

FIG. 5

Data Manager

| Planting 1(4 Fields) | Planting 2(0 Fields) | Planting 3(0 Fields) | Planting 4(1 Fields) |
|---|---|---|---|
| Crop Corn Product | Crop Corn Product | Crop Corn Product | Crop Corn Product |
| Plant Date: 2016-04-12 | Plant Date: 2016-04-15 | Plant Date: 2016-04-13 | Plant Date: 2016-04-13 |
| ILU 112 \| Pop: 34000 | ILU 83 \| Pop: 34000 | ILU 83 \| Pop: 34000 | ILU 112 \| Pop: 34000 |
| [Edit] [Apply] | [Edit] [Apply] | [Edit] [Apply] | [Edit] [Apply] |

[Nitrogen] [Planting] [Practices] [Soil]

Add New Planting Plan [+]

| | | CROP | PLANTED ACRES | PRODUCT | RELATIVE MATURITY | TARGET YIELD | POPULATION(AVG) | PLA |
|---|---|---|---|---|---|---|---|---|
| ☐ | Select All | | | | | | | |
| ☐ | Ames, IA 1 Corn \| 100 \| Boone, IA | Corn | — | DMC82-M | 112 | 160 | 34000 | Apr |
| ☐ | Austin, MN 1 Corn \| 100 \| Fredricks, MN | Corn | — | DMC82-M | 114 | 160 | 36000 | Apr |
| ☐ | Boone, IN 1 Corn \| 100 \| Boone, IA | Corn | — | DMC82-M | 112 | 150 | 34000 | Apr |
| ☐ | Champaign 1 Corn \| 100 \| Champaign, IL | Corn | — | — | 112 | 200 | 34000 | Apr |
| ☐ | E Nebraska 1 Corn \| 100 \| Burt, NE | Corn | — | — | 112 | 160 | 34000 | Apr |

FIG. 6

COMPUTING RISK FROM A CROP DAMAGING FACTOR FOR A CROP ON AN AGRONOMIC FIELD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2017 The Climate Corporation.

FIELD OF THE DISCLOSURE

The present disclosure relates to digital modeling of agronomic fields using a server computer. Specifically, the present disclosure relates to modeling a likelihood of particular diseases presenting on a field based on field data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Field managers are faced with a wide variety of decisions to make with respect to the management of agricultural fields. These decisions range from determining what crop to plant, which type of seed to plant for the crop, when to harvest a crop, whether to perform tillage, irrigation, application of insecticides, application of fungicides, and application of fertilizer, and what types of insecticides, fungicides, and fertilizers to apply.

Field managers must also contend with outside phenomena which affect the yield of their crops. For instance, certain types of insects and diseases can have a large impact on the health of a crop and thus the amount the crop yields. Corn in particular is susceptible to diseases such as northern leaf blight and gray leaf spot.

In order to combat the effects of insects or diseases on crops, a field manager may apply insecticide or fungicide to a field. Fungicide reduces the risk of fungal diseases impacting yield. Insecticide reduces the risk of damage to the crop from insects. While applying chemicals is useful in preventing damage from insects or disease, it also comes at a cost. Applying insecticide or fungicide to a field that is not in danger of being affected by insects or disease can be a waste that costs a field manager some of the total revenue from sale of the crop.

Generally, a field manager has limited options for determining whether the field is currently being affected by insects or disease or is about to be affected by insects or disease. A field manager maintaining hundreds of acres of crops may not have the resources to manually check each location for signs of damage from insects or disease. Additionally, it is complex or sometimes impossible for a field manager to predict when, if ever, insects or disease may inflict significant damage on crops.

Thus, there is a need for a system or method to predict the onset and eventual impact of damage to a crop based on insects or disease.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

DETAILED DESCRIPTION

Figure 1:
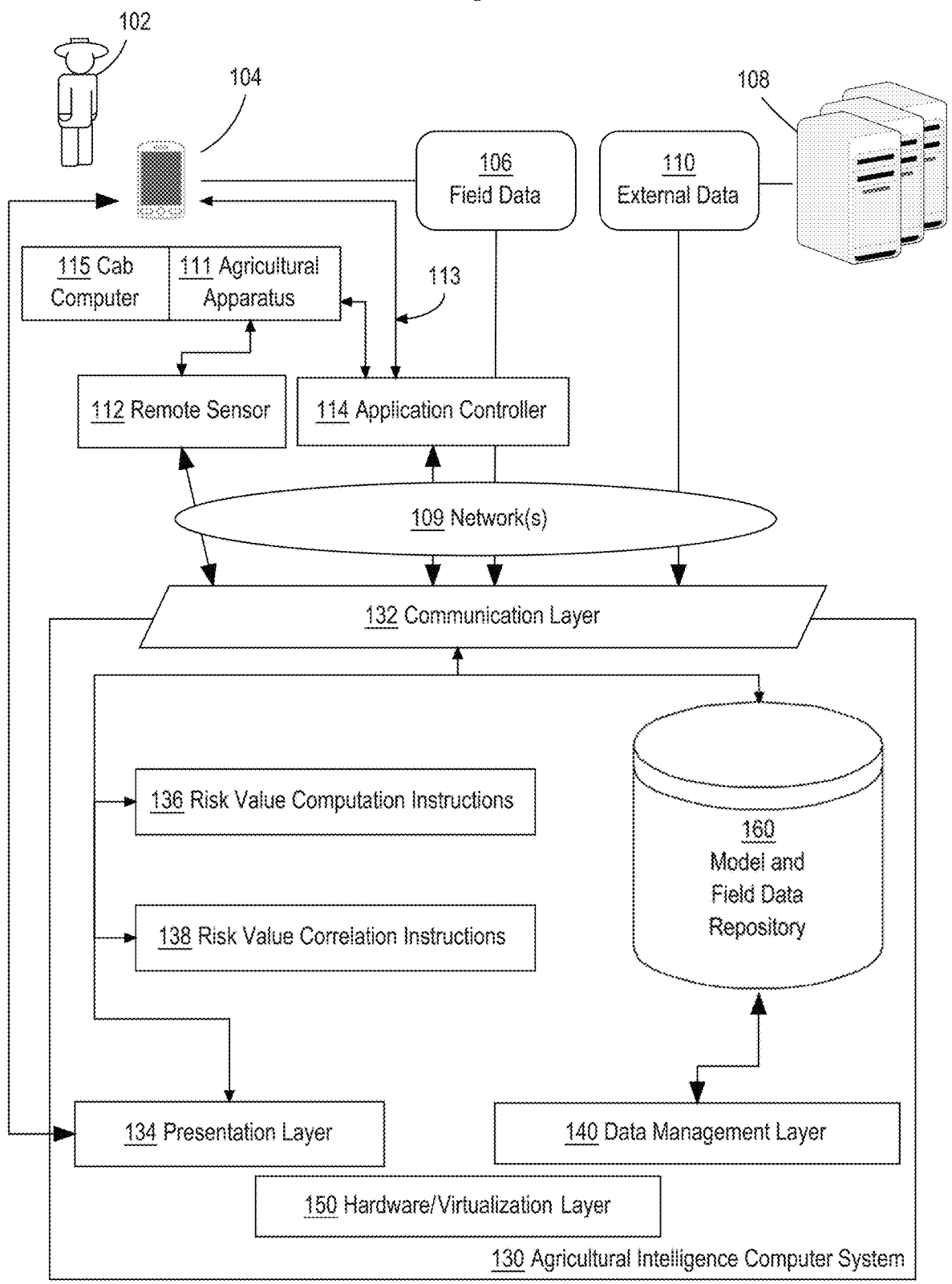
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. ESTIMATING RISK OF CROP DAMAGE
   3.1. RECEIVED DATA
   3.2. ENVIRONMENTAL RISK HOURS AND RISK DAYS
   3.3. COMPUTING RISK VALUES
   3.4. DETERMINING RISK
   3.5. DATA USAGE
4. BENEFITS OF CERTAIN EMBODIMENTS
5. EXTENSIONS AND ALTERNATIVES

1. General Overview

Aspects of the disclosure relate to computer implemented methods for determining a risk of damage to crops on an agronomic field from a crop damaging factor. In an embodiment, a computer system receives weather data for a plurality of hours of a plurality of days for a particular agronomic field. The computer system determines, for each hour, whether the temperature is within a first range of values and the humidity is within a second range of values. If the computer system determines both values are within the respective ranges, the computer system identifies the hour as a risk hour. Using identified risk hours over the course of a crop's development, the computer system determines a risk to the crop of damage from a crop damaging factor. The computer system may then attempt to mitigate the risk by recommending application of a damage mitigating chemical and/or determine new practices for the future to reduce the risk of damage due to a crop damaging factor.

In an embodiment, a method comprises receiving, for each hour of a first day, weather data identifying temperature values and humidity values associated with a geographic location; determining, for a particular hour of the first day, that a temperature value is within a first range of values and a humidity value is within a second range of values and, in response, identifying the particular hour as a risk hour; computing, for a second day, a risk value for one or more agronomic fields at the geographic location based, at least in part, on one or more identified risk hours between a day of planting a crop on the one or more agronomic fields and the second day; determining that the risk value is above a risk value threshold and, in response, determining that the crop on the one or more agronomic fields is at risk of suffering damage from a particular crop damaging factor; storing data indicating that the crop is at risk of suffering damage from the particular crop damaging factor.

2. Example Agricultural Intelligence Computer System 2.1. Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used.

Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
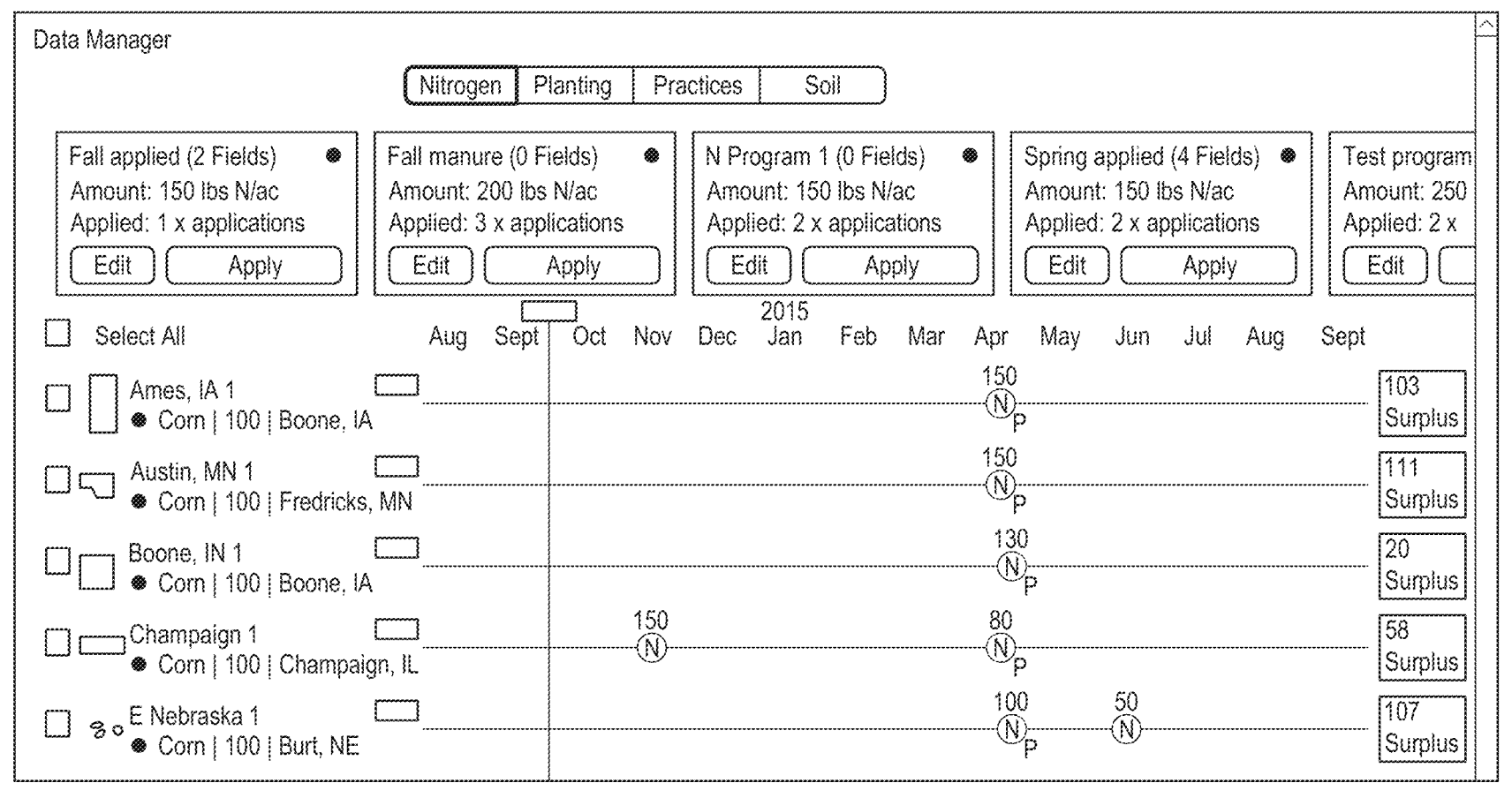

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each of risk value computation instructions 136 and risk value correlation instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the risk value computation instructions 136 may comprise a set of pages in RAM that contain instructions which when executed cause performing the risk value computation functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of risk value computation instructions 136 and risk value correlation instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
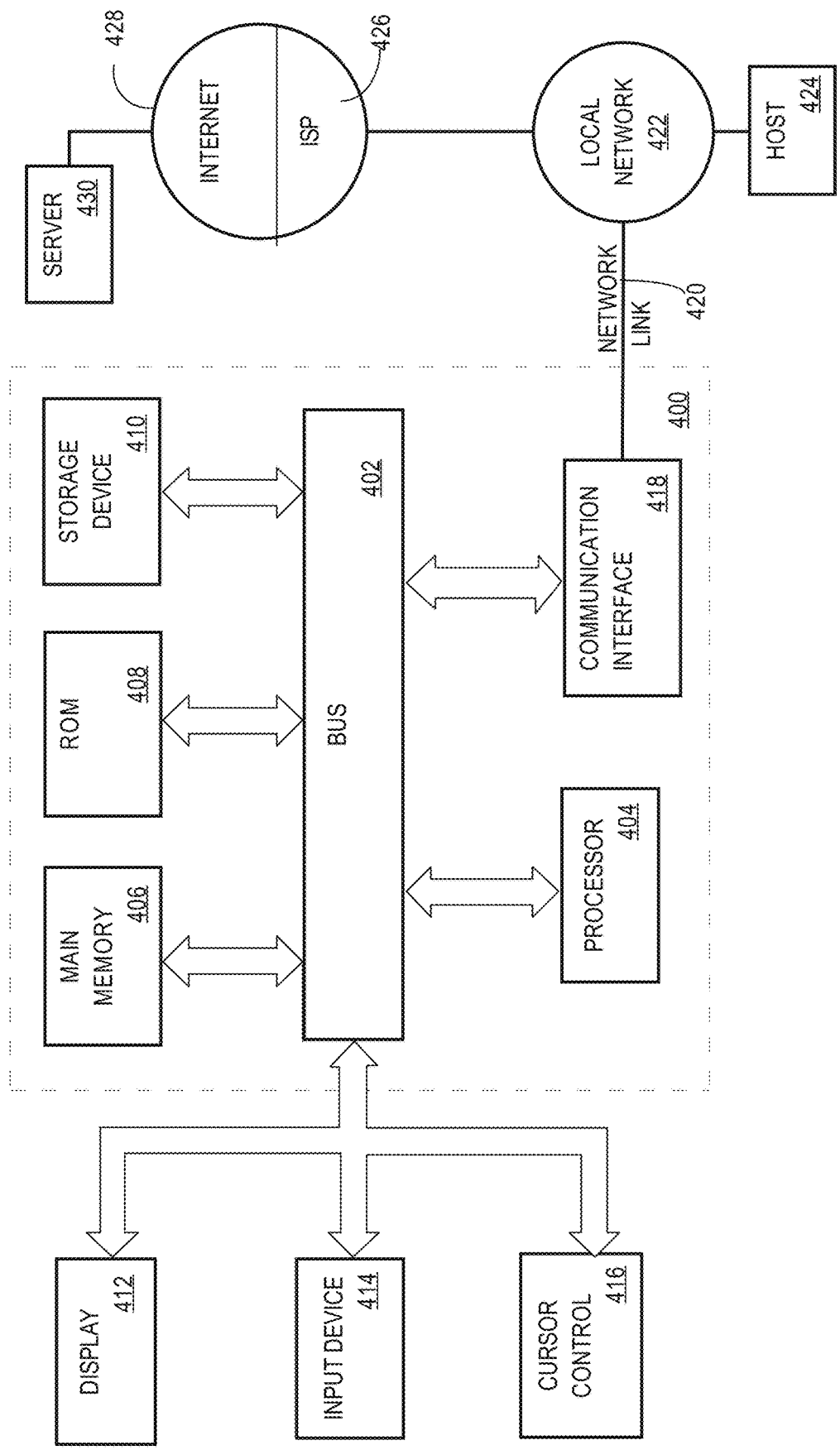
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and U.S. Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV)

apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
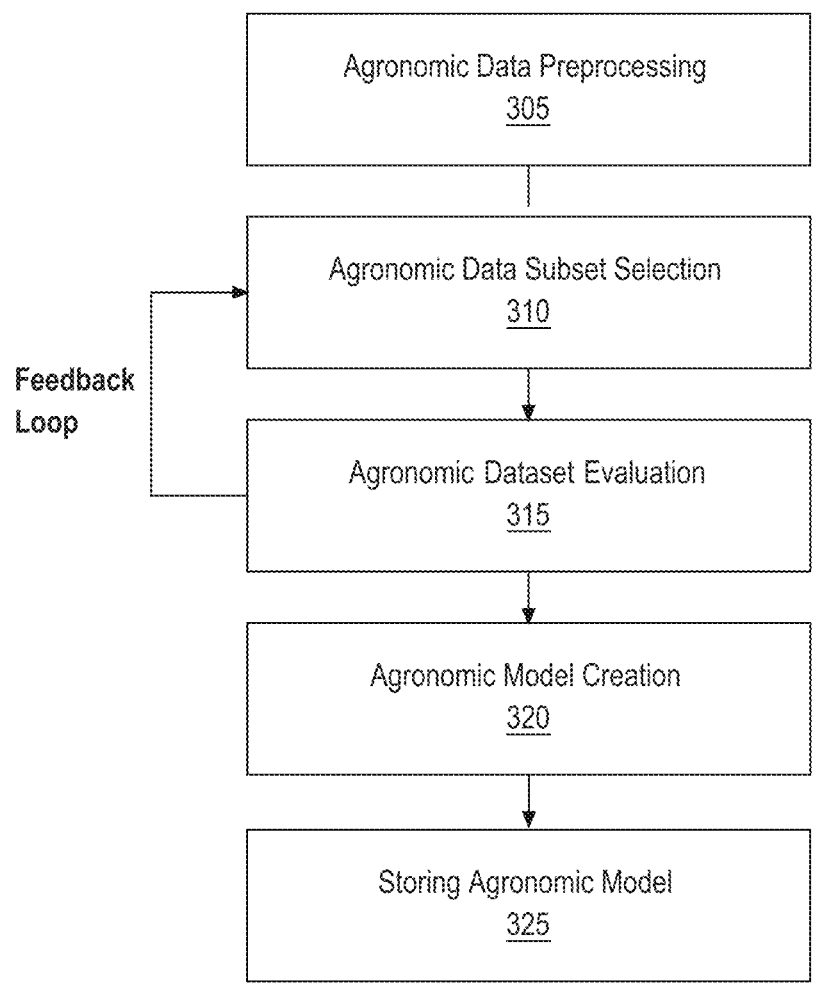
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Estimating Risk of Crop Damage

3.1. Received Data

Figure 7:
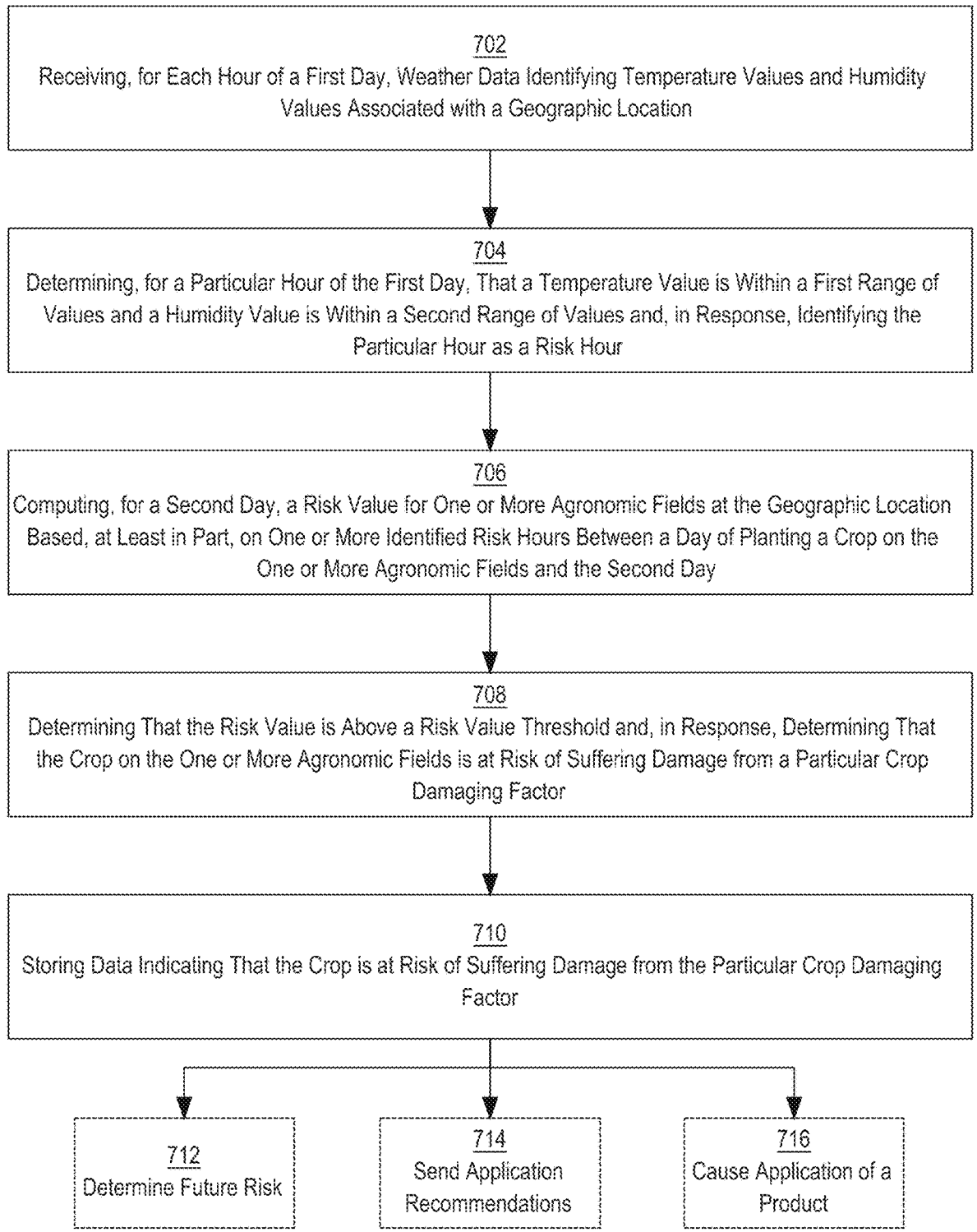
FIG. 7 depicts an example method for determining a risk for a crop on an agronomic field due to one or more crop damaging factors.

FIG. 7 depicts an example method for determining a risk for a crop on an agronomic field due to one or more crop damaging factors. At step 702, weather data identifying temperature values and humidity values associated with a geographic location is received. For example, agricultural intelligence computer system 130 may receive temperature and humidity data from one or more remote sensors on or about the one or more fields, one or more satellites, one or more manned or unmanned aerial vehicles (MAVs or UAVs), one or more on-the-go sensors, and/or one or more external servers.

The temperature and humidity data may include measured temperatures and humidity and/or estimated temperatures and humidity. For example, agricultural intelligence computer system 130 may receive weather forecasts from external server computer 108 with hourly data identifying temperature, humidity, and/or precipitation. Additionally and/or alternatively, agricultural intelligence computer system 130 may use received measured temperatures and humidity to improve weather forecasts.

3.2. Environmental Risk Hours and Risk Days

At step 704, the process determines that, for a particular hour of the first day, a temperature value is within a first range of values and a humidity value is within a second range of values and, in response, the particular hour is identified as a risk hour. For example, agricultural intelligence computer system 130 may store a range of temperature and humidity values for a particular disease that describe optimal temperature and humidity for growth of a disease. If the average temperature and humidity for a particular hour is within the two ranges, agricultural intelligence computer system 130 may identify the hour as a risk hour. Identifying the hour as a risk hour may comprise incrementing a value indicating a number of risk hours for that day and/or storing data identifying the particular hour as a risk hour.

In an embodiment, agricultural intelligence computer system 130 stores different ranges for different crop damaging factors. For example, agricultural intelligence computer system 130 may store a first set of ranges for the Gray Leaf Spot disease which includes a temperature range of 22° C.-30° C. and a relative humidity range of 87%-100%. Agricultural intelligence computer system 130 may additionally store a second set of ranges for the Northern Leaf Blight disease which includes a temperature range of 15° C.-24° C. and a relative humidity range of 87%-100%. In embodiments, agricultural intelligence computer system 130 may additionally store ranges pertaining to optimal conditions for other diseases or insects.

While embodiments are described as using temperature and humidity ranges to determine risk hours, agricultural intelligence computer system 130 may additionally base the determination of a risk hour on one or more additional factors. For example, some diseases, such as northern leaf blight, are harmed by the ultraviolet radiation of the sun. Thus, agricultural intelligence computer system 130 may be programmed or configured to only identify hours as risk hours if the temperatures are within a first range, the relative humidity is within a second range, and the hour is more than a threshold number of hours before sunrise or a threshold number of hours after sunset. The sunrise threshold may differ from the sunset threshold. For instance, the sunrise threshold may be one hour prior to sunrise while the sunset threshold may be two hours after sunset.

Sunrise and sunset data may be received from external server computer 108. Additionally and/or alternatively, one or more UV sensors may identify when UV radiation is present on the field. Agricultural intelligence computer system 130 may be programmed or configured to identify risk hours only for hours prior to one or more UV sensors detecting sunlight or after one or more UV sensors cease to detect sunlight. Sunrise and sunset thresholds may similarly be used with the remote sensors. For example, agricultural intelligence computer system 130 may only consider an hour a risk hour if it occurred at least an hour before the UV sensors detected sunlight or two hours after the UV sensors stopped detecting sunlight.

Other types of environmental data may be used alone and/or in combination with temperature and relative humidity to produce risk hours. Examples of environmental data that may be used include precipitation, wind speed and direction, cloud cover, hail events, extreme weather events, observations of insects, and observations of insect damage in nearby locations. For example, if precipitation intensity is within a particular range, agricultural intelligence computer system 130 may identify the hour as a risk hour. The different types of environmental data may be used for determining risk of different diseases or insects. For example, environmental risk factors for disease may be based on temperature and relative humidity while environmental risk factors for insects may be based on temperature, relative humidity, and one or more of the examples listed above.

In an embodiment, agricultural intelligence computer system 130 may additionally identify anti-risk hours for one or more crop damaging factors. An anti-risk hour refers to an hour with conditions that halt, slow, and/or reverse the effects of a crop damaging factor. For example, some disease on a crop may be damaged by excessive heat or excessive dryness. Thus, if the average temperatures are in a particular range and/or the average humidity is within a particular range, agricultural intelligence computer system 130 may identify the hour as an anti-disease hour. Examples of ranges include if the average temperature is above 35° C. and/or the average humidity is below 15%. Additionally or alternatively, anti-risk hours may be computed based on one or more other factors, such as UV radiation or data indicating spray of a fungicide or insecticide.

In an embodiment, agricultural intelligence computer system 130 may weigh risk hours based on proximity to an optimal temperature. For example, given a temperature range of 22° C.-30° C., an optimal temperature may be set at 26° C. If a temperature for a given hour is at 26° C., agricultural intelligence computer system 130 may weigh the risk hour higher than if the temperature for the given hour is at 29° C. For instance, the server computer may store a value of "1" for temperatures in a first range of 25° C.-27° C., a value of 0.8 for temperatures outside the first range, but in a second range of 24° C.-28° C., and a value of 0.5 for temperatures outside the first and second range, but in a third range of 22° C.-30° C. Weights may be applied to anti-risk hours in a similar manner, where higher temperatures and/or lower humidity measurements are given higher weights.

The server computer may use optimal proximity weights for only temperature, only humidity, or a combination of the two. For example, the server computer may add a temperature weight to a humidity weight to generate a total weight for the risk hours. Additionally or alternatively, the server computer may make a binary determination that the humidity is within the humidity range and use the weights for the temperatures to determine a weighting of the risk hour.

In an embodiment, weights are determined based on a distribution of temperatures. For example, agricultural intelligence computer system 130 may store a Gaussian function with a mean of 26° C. and standard deviation of 2° C. Thus, a received temperature of 26° C. would be associated with the peak of the Gaussian function and thus the highest weight while values closer to 22° C. would receive a minimum weight. As another example, a right-oriented function may be stored for humidity such that humidity levels of 100% would receive the highest weights.

In an embodiment, agricultural intelligence computer system 130 assigns weights to risk hours based on a growth stage of the crop. For example, agricultural intelligence computer system 130 may initially receive data identifying a relative maturity of a crop and/or a number of growing degree days until maturity for the crop. Agricultural intelligence computer system 130 may use growing degree days to model the growth of the crop through different various growth stages. Agricultural intelligence computer system 130 may additionally assign weights to different growing stages. For example, a higher weight may be assigned to risk hours that occur during the V6-V12 growth stages for a particular crop damaging factor. Thus, risk hours and/or risk days that were identified during the V6-V12 stages may be multiplied by a first weight when computing risk values.

Different types of weights may be used in combination. For example, agricultural intelligence computer system 130 may apply weights based on proximity to optimal temperatures or humidity. Agricultural intelligence computer system 130 may then apply a second set of weights based on growth stage. Thus, a risk hour at the optimal temperature and humidity during an optimal growth stage may have a value of "1" while a risk hour at a suboptimal temperature during a suboptimal growth stage may be associated with a value of the weighting for the suboptimal temperature multiplied by the weighting for the suboptimal growth stage.

In an embodiment, the server computer computes risk day values from the individual risk hour values. As one method of computing risk day values, agricultural intelligence computer system 130 may determine whether there are more than a threshold number of risk hours in the day. For example, agricultural intelligence computer system 130 may store a risk day threshold value of seven risk hours.

If agricultural intelligence computer system 130 determines there are greater than or equal to seven risk hours in the day, agricultural intelligence computer system 130 may determine that the day is a risk day and assign a value of "1" to the day. If agricultural intelligence computer system 130 determines that there are less than seven risk hours in the day, agricultural intelligence computer system 130 may determine that the day is not a risk day and assign the day a value of "0."

As another method of computing risk day values, agricultural intelligence computer system 130 may aggregate risk hours through the day. Additionally or alternatively, agricultural intelligence computer system 130 may use an average of the risk hours. For example, the risk for a single day may be computed as:

$$R_d = \frac{1}{24} \sum_{hour=0}^{23} R_h$$

where $R_d$ is the daily risk and $R_h$ is the hourly risk. In embodiments where the hourly risk is not weighted, each hourly risk may comprise either a "1" to indicate presence of risk or "0" to indicate an absence of risk.

The above methods of computing daily risk may be used in conjunction with weighted risk values. For example, agricultural intelligence computer system 130 may determine whether a summation of risk values weighted by proximity to optimal temperature is greater than or equal to a threshold value. As another example, agricultural intelligence computer system 130 may compute the total risk for the day as a summation of each risk hour weighted by proximity to optimal temperature divided by twenty-four.

Some weights may be applied before or after the computation of a risk day. For example, the risk days may be weighted based on growth stage of the crop by multiplying the risk day value by the weight for the growth stage. Additionally or alternatively, the risk hours may be multiplied by the weight for the growth stage and then aggregated into risk days using either of the methods described herein.

3.3. Computing Risk Value

At step 706, a risk value for one or more agronomic fields at the geographic location is computed based, at least in part, on one or more identified risk hours between a day of planting a crop on the one or more agronomic fields and the second day. For example, agricultural intelligence computer system 130 may compute one or more of a cumulative disease risk, an integral of the cumulative disease risk, a normalized cumulative disease risk, and/or a normalized integral of the cumulative disease risk.

The second day may be a current day, a past day, or a future day. For example, agricultural intelligence computer system 130 may use weather forecasts to identify risk hours and/or risk days for future days. Agricultural intelligence computer system 130 may compute the risk value for a day in the future using the identified risk hours and/or risk days based on the weather forecasts.

The cumulative disease risk may be computed as a summation of risk hours and/or risk days up until a measurement day. For example, the cumulative disease risk for a day that is x days after planting of the crop may be computed as:

$$C_d(x) = \sum_{day=1}^{x} R_d$$

where $C_d$ is the cumulative disease risk x days after planting of the crop and $R_d$ is an environmental risk value for the day. The $R_d$ value may be an accumulation of risk hours for the day and/or a risk day value computed using one of the methods described herein. In embodiments where agricultural intelligence computer system 130 generates anti-risk hours, anti-risk hours may be treated as negative values of risk hours, such that if a risk hour is set at a value of "1," an anti-risk value will be set at a value of "−1."

The integral of the cumulative disease risk may be computed as an accumulation of the cumulative disease risk for each day up until a measurement day. For example, the integral of the cumulative disease risk for a day that is x days after planting of the crop may be computed as:

$$Id(x) = \sum_{d=1}^{x} C_d$$

where Id is the integral of the cumulative disease risk x days after planting of the crop and $C_d$ is risk the cumulative risk disease on day d. The integral of the cumulative disease risk emphasizes early season disease-favorable conditions over those that occur later in the season.

A transformation that can be applied is to normalize the cumulative disease risk or the integral of the cumulative disease risk by the maximum possible value for that same measure, which is derived by assuming every day since planting has seen the maximum possible risk. In this formulation, the normalized cumulative risk may be computed as the average daily disease risk whereas the normalized integral of cumulative risk may be computed as a function of integral of cumulative disease risk divided by the integral of cumulative days since planting. As an example, the normalized cumulative disease risk and the normalized integral of the cumulative disease risk may be computed as follows:

$$C_n(x) = \frac{C(x)}{x}$$

$$I_n(x) = \frac{I(x)}{x(1+x)/2}$$

where $C_n(x)$ is the normalized cumulative disease risk x days after planting of the crop and $I_n(x)$ is the normalized integral of cumulative disease risk x days after planting of the crop and where x(1+x)/2 is the closed form solution for the integral of cumulative days since planting.

In an embodiment, the risk values are computed based on weighted risk days and/or risk hours. For example, agricultural intelligence computer system 130 may compute weighted risk hours and/or weighted risk days using one or more of the methods described herein. Agricultural intelligence computer system 130 may then compute a risk value using the weighted risk day values and/or the weighted risk hour values.

3.4. Determining Risk

At 708, the process determines that the risk value is above a risk value threshold and, in response, a determination is made that the crop on the one or more agronomic fields is at risk of suffering damage from a particular crop damaging factor. For example, the agricultural intelligence computer system 130 may store a threshold value indicating a high level of risk of crop damage from disease. If the computed risk value is above the threshold value, agricultural intelligence computer system 130 may determine that a crop on the one or more fields is at risk of suffering damage from the particular crop damaging factor. As used herein, suffering damage refers to a negative impact on crop yield, crop health, and/or crop quality.

In an embodiment, the threshold is established for a particular period of time. For example, an optimal time for application of fungicide and/or insecticide may occur at a particular growth stage for a crop. Agricultural intelligence computer system 130 may store a risk value threshold for the particular stage of the crop. If, when the crop is at the particular growth stage, the risk value is above the risk value threshold, agricultural intelligence computer system 130 may determine that the crop is at risk and may benefit from application of an insecticide or fungicide.

In an embodiment, agricultural intelligence computer system 130 correlates risk values at a particular stage of development with a quantification of negative impacts on crop yield, crop health, and/or crop quality. For example, agricultural intelligence computer system 130 may receive test data which includes at least a risk value for an agronomic field and a yield for the agronomic field. The test data may additionally include average yields for fields in similar locations growing similar crops and/or a yield of a particular field growing the same crop in which a fungicide and/or insecticide was used. Using the test data, agricultural intelligence computer system 130 may correlate differences in yields between protected crops and unprotected crops with a risk value at a particular stage of development.

By correlating risk values with a quantification of loss of crop yield, agricultural intelligence computer system 130 is able to generate useful risk value thresholds. For example, if the test data indicates that a particular risk value during the V4 stage of development is highly correlated with a loss of 10 bu/acre of yield, agricultural intelligence computer system 130 may set the particular risk value to be a risk value threshold. Thus, if agricultural intelligence computer system 130 computes a risk value above the risk value threshold during the V4 stage of development, agricultural intelligence computer system 130 may determine that the agronomic field runs a high risk of suffering a loss of 10 bu/acre due to the one or more crop damaging factors.

In an embodiment, agricultural intelligence computer system 130 uses the risk values to more accurately model growth of a crop. For example, agricultural intelligence computer system 130 may correlate different risk values to differences in growth of the crop. This allows agricultural intelligence computer system 130 to convert the risk values to values which can be subtracted from the growth of a crop. Thus, growth of the crop may be modeled as:

$$G = GDD - \propto R_T$$

where G is the growth of the crop, GDD is a number of growing degree days, $\propto$ is a value used to convert the total risk value, $R_T$ into a loss of growing degree days.

In an embodiment, agricultural intelligence computer system 130 converts risk values to different levels of risk. For example, a first range of risk values may be identified as little to no risk, a second range of risk values may be identified as moderate risk, and a third range of values may be identified as severe risk. Agricultural intelligence computer system 130 may identify a risk level for a particular agronomic field by determining whether the risk value for the agronomic field is within a particular range of values. Thus, determining whether a risk value is over a threshold may comprise determining that the risk value is above the minimum value for being included in the moderate risk level and/or above the value for being included in the severe risk level.

In an embodiment, agricultural intelligence computer system 130 reduces risk values and/or risk levels based on data identifying management practices. For example, agricultural intelligence computer system 130 may reduce a risk level based on data identifying a seed type of the crop as being a disease and/or insect resilient seed type, particular types of tillage such as conventional tillage which bury high amounts of crop residue, use of crop rotation on the field, and/or use of insecticides and/or fungicides on the field. In an embodiment, agricultural intelligence computer system 130 may be programmed or configured to drop the risk level by a single risk level in response to identifying one or more of the above factors. Additionally or alternatively, agricultural intelligence computer system 130 may be programmed or configured to increase risk levels based on data identifying a seed type as susceptible, the use of tillage practices which leave more surface reside, such as conservation tillage, continuous planting of the same crop each year, and/or other risk susceptibility factors.

Additionally and/or alternatively, agricultural intelligence computer system 130 may store different values by which a risk value is reduced in response to data identifying particular management practices. For example, if presence of conventional tillage is associated with a value of 50, agricultural intelligence computer system 130 may be programmed or configured to reduce the risk value for the field by 50 in response to determining that conventional tillage was performed on the field. By associating different management practices with different reduction values, agricultural intelligence computer system 130 is able to quantify a reduction in risk associated with specific field or crop characteristics.

Activities such as an application of fungicide and/or insecticide may be used to generate anti-risk hours, stop the identification of risk hours, or reduce the number of accumulated risk hours. For example, application of a particular fungicide may be associated with a particular number of anti-risk hours, such that if agricultural intelligence computer system 130 receives data identifying an application of fungicide, agricultural intelligence computer system 130 may generate anti-risk hours which reduce the overall risk value accumulated. Additionally and/or alternatively, agricultural intelligence computer system 130 may reduce the number of accumulated risk hours by a set amount, such as 200, or by a percentage, such as 95% of accumulated risk hours.

In an embodiment, agricultural intelligence computer system 130 uses data of fungicide and/or insecticide applications to reduce the generation of risk hours for a period of time. For example, agricultural intelligence computer system 130 may store data indicating a number of days of risk that are blocked by a chemical application. When agricultural intelligence computer system 130 receives data indicating an application of the chemical on the field, agricultural intelligence computer system 130 may not identify risk hours for the indicated number of days. Thus, if a fungicide prevents the growth of a fungus for thirty days, then agricultural intelligence computer system 130 may not identify risk hours for thirty days after the application of the fungicide.

At step 710, data indicating that the crop is at risk of suffering damage from the particular crop damaging factor is stored. Agricultural intelligence computer system 130 may store the data in order to correlate yield loss with the risk hour computation, recommend application of a fungicide and/or insecticide, generate a script that causes application of a fungicide and/or insecticide on a field, and/or recommend different planting and/or management activities in the future.

3.5. Data Usage

The techniques described thus far may be implemented by computer to provide improvements in another technology, for example plant pathology, plant insect control, agriculture, or agricultural management. For example, at step 712, the process may determine a future risk for damage by the crop damaging factor. At step 714, the process may send application recommendations to a field manager computing device. At step 716, the process may cause application of a product, such as a fungicide, on a field. The agricultural computer system may perform one or more of steps 712-716. Each of the processes described in steps 712-716 are described further herein.

In an embodiment, agricultural intelligence computer system 130 uses the computation of risk values to determine a future likelihood of the crop suffering from a crop damaging factor. For example, agricultural intelligence computer system 130 may use fourteen-day weather forecasts to determine likely risk hours or risk days into the future. Using the fourteen-day forecasts, agricultural intelligence computer system 130 may determine future risk hours and/or risk days. Agricultural intelligence computer system 130 may then compute risk values for the next fourteen days using the future risk hours and/or risk days. By computing total risk values for the future, agricultural intelligence computer system 130 is able to identify growing risk of a crop damaging factor affecting the crop in the future and thereby make recommendations to prevent further damage to the crop.

Agricultural intelligence computer system 130 may use the risk values and correlations to crop damage to generate damage mitigating chemical application recommendations. Damage mitigating chemical application recommendations may include recommendations to apply fungicide or insecticide to a field to reduce and/or prevent damage to a crop on the field. For example, agricultural intelligence computer system 130 may determine that a risk value for the crop in the next fourteen days is highly correlated with a particular level of crop damage using the methods described herein.

Agricultural intelligence computer system 130 may additionally determine a benefit of applying a fungicide, such as by comparing the correlation between risk value and total yield with correlations between crops with similar risk values which received fungicide and total yield. If agricultural intelligence computer system 130 determines that the risk value will exceed a threshold within the next fourteen days, agricultural intelligence computer system 130 may generate a recommendation to apply fungicide to the crop, thereby reducing the probability of disease. By modeling the crop damaging factors occurring in the future, agricultural intelligence computer system 130 is able to generate recommendations that, if implemented, prevent damage to the crop.

In an embodiment, the damage mitigating chemical application recommendations are sent to a field manager computing device. For example, agricultural intelligence computer system 130 may cause a notification to be displayed on the field manager computing device identifying one or more fields and/or one or more portions of the field that are likely to present with a particular disease, thereby giving the field manager the opportunity to prevent the disease. The damage mitigating chemical application recommendation may identify a likely benefit to the field of applying a particular chemical, such as a particular type of fungicide. For example, agricultural intelligence computer system 130 may compute an estimate of yield loss if disease presents. Based on the estimate of loss, agricultural intelligence computer system 130 may determine a benefit to crop yield and/or revenue of applying a particular fungicide. A fungicide recommendation may identify the likely increase in crop yield and/or revenue for applying the particular fungicide.

Additionally or alternatively, agricultural intelligence computer system 130 may cause implementation of the damage mitigating chemical application recommendation on one or more fields. For example, agricultural intelligence computer system 130 may generate a script which, when executed by an application controller, causes the application controller to control a field implement which releases fungicide onto a field. Thus, agricultural intelligence computer system 130 may determine whether a disease is likely to present within a particular period of time and, in response, cause prevention of the disease through application of a fungicide.

In an embodiment, agricultural intelligence computer system 130 continuously monitors values for a particular field in order to determine when to apply a damage mitigating chemical. For example, if agricultural intelligence computer system 130 has access to fourteen-day forecasts, agricultural intelligence computer system 130 may periodically compute risk values for the field. Thus, as the growing season progresses, agricultural intelligence computer system 130 may track the growth of the risk value and generate fungicide recommendations as a risk value for disease surpasses particular stored thresholds. For instance, agricultural intelligence computer system 130 may do new computations every seven days using fourteen-day forecasts. When agricultural intelligence computer system 130 detects that the risk value has surpassed a particular threshold, agricultural intelligence computer system 130 may generate the damage mitigating chemical application recommendation.

Additionally and/or alternatively, agricultural intelligence computer system 130 may determine risk values at particular portions of the crop development in order to generate a damage mitigating chemical application recommendation for particular portions of the crop development. For example, agricultural intelligence computer system 130 may be programmed or configured to generate recommendations for spraying fungicide during the V6-V12 portion of a crop's growth stage.

Agricultural intelligence computer system 130 may identify risk values prior to the V6-V12 growth stage using observed temperature and humidity data and/or risk values during or after the V6-V12 growth stage using observations and/or forecasts. Based on the risk values, agricultural intelligence computer system 130 may determine whether to generate a damaging mitigating chemical application recommendation for the crop and/or field. For example, if a risk value computed for an agronomic field for a particular day exceeds a risk threshold for that day, agricultural intelligence computer system 130 may generate a recommendation to spray the agronomic field with a damage mitigating chemical on the field.

In an embodiment, agricultural intelligence computer system 130 uses the risk values to recommend different actions for the field manager for upcoming seasons. For example, if agricultural intelligence computer system 130 computes a relatively high risk value which is associated with crop damage on the field, agricultural intelligence computer system 130 may compute likelihood that disease would have presented given a different type of tillage, different type of seed planted, different type of harvesting, crop rotation, or one or more other different management practices, such as by reducing the risk value using the methods described herein. For instance, if minimal tillage was initially used, agricultural intelligence computer system 130 may compute the risk value if conventional tillage was used. If agricultural intelligence computer system 130 determines that changing the tillage type would have reduced the risk value past a particular threshold, agricultural intelligence computer system 130 may recommend changing the tillage type for one or possibly multiple future seasons.

In an embodiment, agricultural intelligence computer system 130 uses the risk values to build a correlation between risk values at particular stages of crop development with a quantification of negative impact on the crop. For example, agricultural intelligence computer system 130 may receive risk temperature and humidity values for a plurality of fields during the course of crop development. Agricultural intelligence computer system may also receive total yield values for the field and data indicating loss of yield due to a crop damaging factor. The data indicating loss of yield may be based on observations of loss due to the crop damaging factor and/or comparisons of yield to similarly situated locations which employed a damage mitigating chemical to reduce and/or prevent damage to the crop.

In an embodiment, agricultural intelligence computer system 130 uses risk values from a plurality of fields to identify one or more fields for implementing a trial. For example, agricultural intelligence computer system 130 may identify, for a particular agronomic field of a plurality of agronomic fields, a relatively high risk value, i.e. a risk value that is higher than the average risk value for the plurality of agronomic fields. Based on the relatively high risk value, agricultural intelligence computer system 130 may determine that the agricultural field would benefit from implementing a trial, such as a insecticide trial and/or a fungicide trial. Methods for implementing trials are discussed in U.S. Provisional Application No. 62/548,396, the contents of which are incorporated by reference as if fully set forth herein. Results of the trials may be used to correlated risk values with damage to the crop and/or to identify benefits to agronomic fields of applying one or more damage mitigating chemicals.

In an embodiment, agricultural intelligence computer system 130 uses risk values from a plurality of fields to identify locations that would benefit from one or more products. For example, agricultural intelligence computer system 130 may identify geographic locations which received higher than average risk values and/or risk values that are, on average, higher than a risk threshold. Agricultural intelligence computer system 130 may then recommend particular hybrid seeds for the geographic locations. For example, if the risk values indicate a high risk of disease for the locations, agricultural intelligence computer system 130 may recommend disease resistant seeds for the location.

4. Benefits of Certain Embodiments

Numerous benefits and improvements provided by the techniques herein have been described in the preceding section. Furthermore, using the techniques described herein, a computing device can track the risk of a disease affecting crops on a field. Agricultural intelligence computer system 130 may then act on that risk by either providing a field manager computing device with a recommendation for avoiding damage to the crop based on the risk and/or by controlling an implement on the field and causing the implement to release fungicide onto the field. By doing so, agricultural intelligence computer system 130 provides data which can be used to protect crops, increase crop yield, and generate stronger digital models of the crop during development.

5. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
one or more processors;
a memory storing instructions which, when executed by the one or more processors, cause performance of:
receiving, for each hour of a first day, weather data identifying temperature values and humidity values associated with a geographic location;
determining, for a particular hour of the first day, that a temperature value is within a first range of values and a humidity value is within a second range of values and, in response, identifying the particular hour as a risk hour, a risk hour comprising an hour in which the temperature value for an hour is within the first range of values and a humidity value is within the second range of values;
computing, for a second day, a risk value for one or more agronomic fields at the geographic location by multiplying ones of the identified risk hours by a weight associated with a growth stage of a crop on the one or more agronomic fields during the identified risk hour and a weight associated with the temperature value during the identified risk hour relative to an optimal temperature and then computing the risk value as a summation of the weighted risk hours between a day of planting the crop on the one or more agronomic fields and the second day;
determining that the risk value is above a risk value threshold and, in response, determining that the crop on the one or more agronomic fields is at risk of suffering damage from a particuiar crop damaging factor;
storing data indicating that the crop is at risk of suffering damage from the particuiar crop damaging factor;
in response to determining that the crop is at risk of suffering damage from the particular crop damaging factor, generating one or more sets of instructions which, when executed by an application controller, cause the application controller to control an implement on the one or more agronomic fields to cause the implement to spray the agronomic field with a damage mitigating chemical;
sending the one or more sets of instructions to the application controller, wherein the one or more sets of instructions are executed by the application controller to cause the application controller to cause the implement to spray the agronomic field with the damage mitigating chemical.

2. The system of claim 1, wherein the particular crop damaging factor is a disease that negatively impacts growth of the crop and wherein the damage mitigating chemical is a fungicide.

3. The system of claim 1, wherein the particular crop damaging factor is an insect that negatively impacts growth of the crop and wherein the damage mitigating chemical is an insecticide.

4. The system of claim 1, wherein the instructions, when executed by the one or more processors, further cause performance of:
in response to determining that the crop is at risk of suffering damage from the particular crop damaging factor, generating one or more damage mitigating chemical application recommendations;
sending the one or more damage mitigating chemical application recommendations to a field manager computing device.

5. The system of claim 1, wherein the instructions, when executed by the one or more processors, further cause performance of:
determining, for a second hour, that a temperature value is between a third range of values and, in response, identifying the second hour as an anti-risk hour;
computing the risk value further comprises decrementing the risk value for each hour identified as an anti-risk hour between the day of planting the crop and the second day.

6. The system of claim 1, wherein the instructions, when executed by the one or more processors further cause performance of:
storing one or more correlations between a first risk value at a particular stage of crop growth and a total yield for the crop;
computing, using the risk value and the one or more correlations, a quantification of expected damage to the crop based, at least in part, on the risk value for the second day and the one or more correlations.

7. A method comprising:
receiving, for each hour of a first day, weather data identifying temperature values and humidity values associated with a geographic location;
determining, for a particular hour of the first day, that a temperature value is within a first range of values and a humidity value is within a second range of values and, in response, identifying the particular hour as a risk hour, a risk hour comprising an hour in which the temperature value for an hour is within the first range of values and a humidity value is within the second range of values;
computing, for a second day, a risk value for one or more agronomic fields at the geographic location by multiplying ones of the identified risk hours by a weight associated with a growth stage of a crop on the one or more agronomic fields during the identified risk hour and a weight associated with the temperature value during the identified risk hour relative to an optimal temperature and then computing the risk value as a summation of the weighted risk hours between a day of planting the crop on the one or more agronomic fields and the second day; determining that the risk value is above a risk value threshold and, in response, determining that the crop on the one or more agronomic fields is at risk of suffering damage from a particular crop damaging factor;
storing data indicating that the crop is at risk of suffering damage from the particular crop damaging factor;

in response to determining that the crop is at risk of suffering damage from the particular crop damaging factor, generating one or more sets of instructions which, when executed by an application controller, cause the application controller to control an implement on the one or more agronomic fields to cause the implement to spray the agronomic field with a damage mitigating chemical;

sending the one or more sets of instructions to the application controller, wherein the one or more sets of instructions are executed by the application controller to cause the application controller to cause the implement to spray the agronomic with the damage mitigating chemical.

8. The method of claim 7, wherein the particular crop damaging factor is a disease that negatively impacts growth of the crop and wherein the damage mitigating chemical is a fungicide.

9. The method of claim 7, wherein the particular crop damaging factor is an insect that negatively impacts growth of the crop and wherein the damage mitigating chemical is an insecticide.

10. The method of claim 7, further comprising:
in response to determining that the crop is at risk of suffering damage from the particular crop damaging factor, generating one or more damage mitigating chemical application recommendations;
sending the one or more damage mitigating chemical application recommendations to a field manager computing device.

11. The method of claim 7, further comprising: determining, for a second hour, that a temperature value is between a third range of values and, in response, identifying the second hour as an anti-risk hour;
wherein computing the risk value further comprises decrementing the risk value for each hour identified as an anti-risk hour between the day of planting the crop and the second day.

12. The method of claim 7, further comprising:
storing one or more correlations between a first risk value at a particular stage of crop growth and a total yield for the crop;
computing, using the risk value and the one or more correlations, a quantification of expected damage to the crop based, at least in part, on the risk value for the second day and the one or more correlations.

* * * * *